Jan. 15, 1924.
C. P. McNEIL
1,480,561
COATING GRANULES
Original Filed April 21, 1919
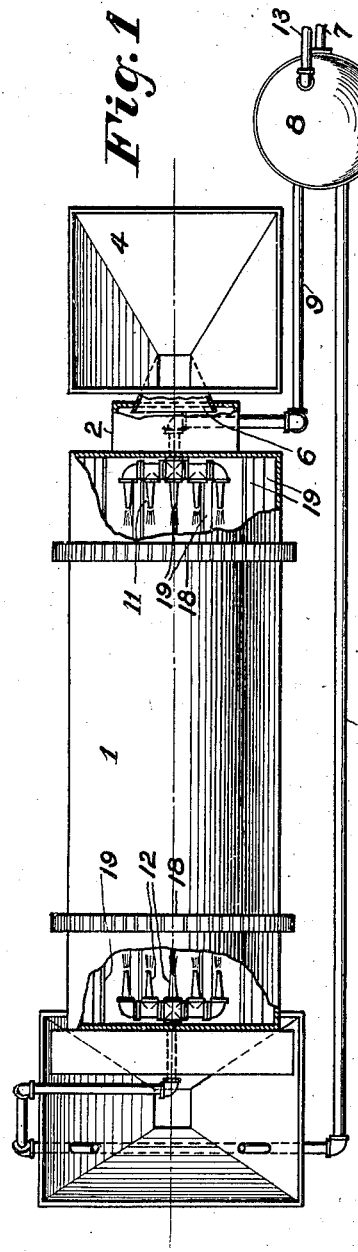
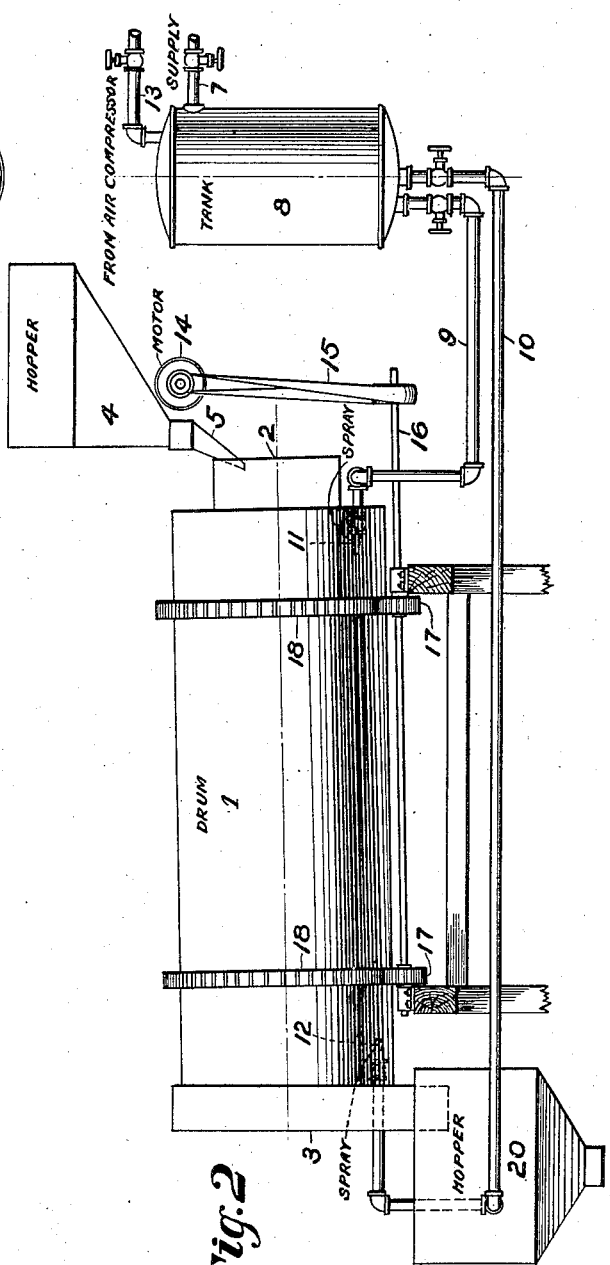

Patented Jan. 15, 1924.

1,480,561

UNITED STATES PATENT OFFICE.

CLAUDE P. McNEIL, OF WHITING, INDIANA, ASSIGNOR TO SECRETARY OF WAR OF THE UNITED STATES OF AMERICA, TRUSTEE.

COATING GRANULES.

Original application filed April 21, 1919, Serial No. 291,585. Divided and this application filed January 16, 1922. Serial No. 529,789.

(FILED UNDER THE ACT OF MARCH 3, 1883, 22 STAT. L., 625.)

*To all whom it may concern:*

Be it known that I, CLAUDE P. McNEIL, a citizen of the United States, residing at 431 Oliver St., Whiting, Indiana, have invented an Improvement in Coating Granules, of which the following is a specification.

The invention described herein may be used by the Government, or any of its officers or employees, in prosecution of work for the Government, or by any other person in the United States, without payment of any royalty thereon.

This application is a division of my application Serial No. 291,585, filed April 21, 1919.

This invention relates to the spraying of granules and has for its object the production of a granule which is uniformly coated over its entire surface. In order to carry the objects of my invention into effect, I provide a process wherein chemicals in solution and liquids are sprayed over the granules.

My invention has been successfully applied to the coating of soda-lime with sodium permanganate. Permanganate coated soda-lime has been found useful for the absorption of certain gases used in warfare and encountered in the industries, such as arsine, phosgene, and other chlorinated organic compounds, $CO_2$ gas and the like. Formerly, the sodium permanganate solution was incorporated in the granule during the process of formation of the same but, since the yield of granules of the required size is only about 40% of the total weight of impregnated soda-lime, 60% of the permanganate used was lost together with the rejected fines. The permanganate is comparatively expensive while the other ingredients are comparatively cheap, hence, the building up of the granule without the permanganate and adding the permanganate after the fines have been removed, effects a great saving in permanganate. This procedure may be applied to a variety of substances and has been adapted to the spraying of soda-lime granules with permanganate, navy soda-lime with water, in the application of various chemicals such as copper sulphate, formaldehyde, caustic soda, etc., to charcoal granules, and many others.

A typical form of apparatus used in the process is disclosed in the accompanying drawing wherein:

Fig. 1 is a plan view of the preferred form of my apparatus, parts of the device being shown broken in order to illustrate interior portions of same.

Fig. 2 is a side elevation.

The apparatus consists of a cylinder or drum (1) constituting the revolving spraying chamber and provided with stationary hoods (2) and (3) at each end. A feed hopper (4) is provided at one end of the cylinder to which is attached a chute (5) leading through the hood (2) into the spraying chamber (1). The chute (5) may be equipped with sliding gates for controlling the flow of the granules which are fed from the hopper (4) into the spraying chamber (1). The end of the chute (5) is fitted with a fan-shaped distributor, shown at (6) for spreading the granules so that they will not pile up at any point.

The spraying fluid is supplied from a suitable source through the supply pipe (7) to the tank (8) from which it is drawn through the pipes (9) and (10) and delivered through the spray nozzles or atomizers (11) and (12) into the spraying chamber (1). Compressed air or other gas may be supplied through the pipe (13) to the tank (8) in order to aid the forcing of the spraying fluid out from the tank (8) through the nozzles (11) and (12).

The cylinder or drum (1) is preferably inclined as shown in Fig. 2, the portion of the cylinder where the granules enter same being higher than the discharge end. Rotary motion is imparted to the cylinder (1) by means of the motor (14), belt (15), shaft (16), gears (17), and racks (18). As this cylinder revolves the hoods (2) and (3) remain stationary. The granules within the cylinder are tumbled and agitated by the revolution of the cylinder (1) and the agitation may be increased by providing the interior of the cylinder (1) with baffle plates (19). As the cylinder (1) rotates the granules gravitate toward the discharge end and pass into the hopper (20).

A plurality of atomizers are usually provided at each end of the cylinder, and they are so mounted that they can be directed into the chamber at any angle, thus giving considerable flexibility in operation. As the cylinder (1) revolves the granules are tumbled and rolled over and some are dropped through the spray. It will be seen that the granules as they are fed from the hopper through the chute (5) into the spraying chamber (1) pass through the jets of spraying fluid issuing from the nozzles (11). This facilitates the uniform spraying of the granules.

The process consists essentially in exposing the granules to an atomized spray of the liquid by both dropping the granules through a spray and spraying the liquid directly upon the granules which are being agitated in a suitable tumbling mechanism. The operation is continuous and the resulting product is uniformly coated due to the agitation and consequent exposure of all the surfaces of the granules to the liquid spray which is in such a finely divided state that it is practically vaporized.

The present invention is not limited to the specific details set forth in the foregoing examples, which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of coating soda-lime granules, passing the granules through a spray of a solution of an oxidizing salt and agitating said granules in a spray of a solution of an oxidizing salt.

2. In a process of coating soda-lime granules, passing said granules through a spray of permanganate and agitating said granules in a spray of permanganate.

CLAUDE P. McNEIL.